(No Model.) 3 Sheets—Sheet 2.
E. NAUMANN.
TIDE MOTOR.
No. 596,335. Patented Dec. 28, 1897.
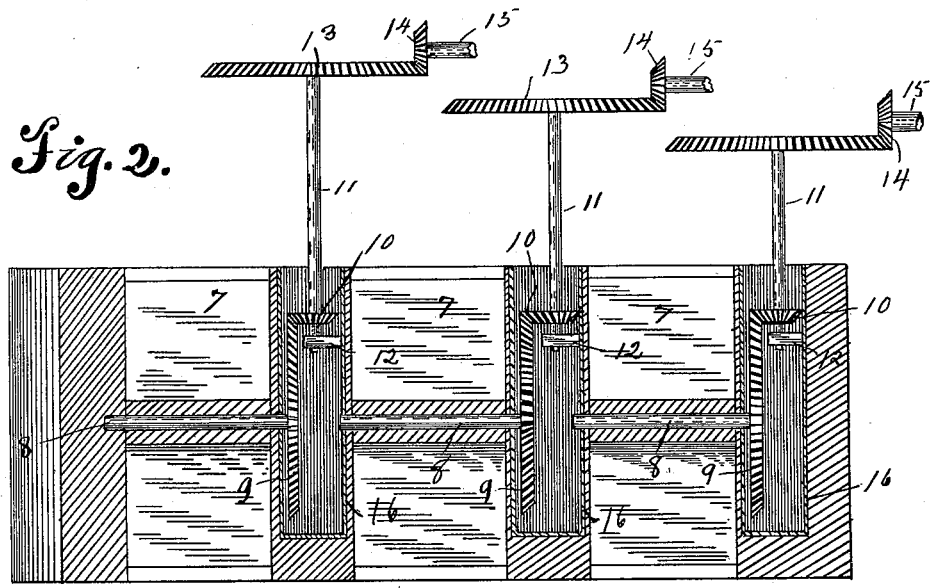
Fig. 2.
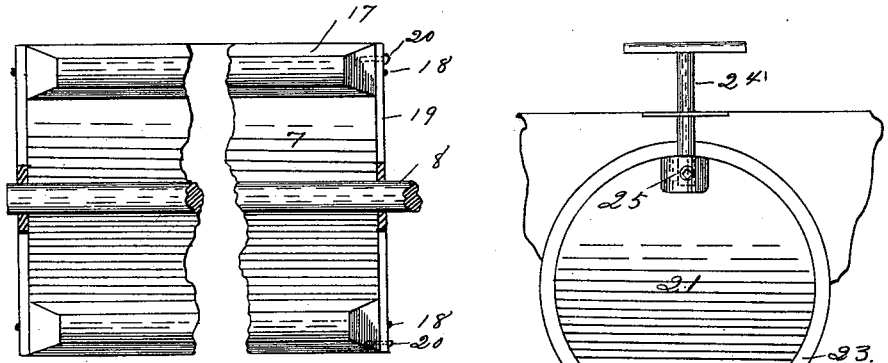
Fig. 3.
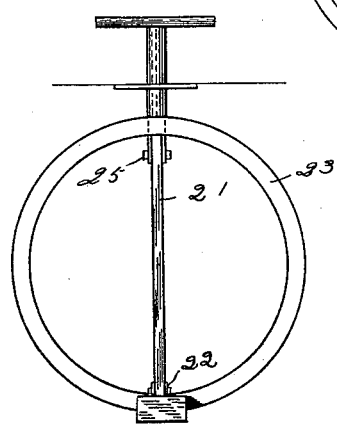
Fig. 4.
Fig. 5.
Witnesses
Frank H. Stright.
A. M. Wilson.
Inventor
Emil Naumann.
By Henry C. Evert, Attorney (No Model.) 3 Sheets—Sheet 3.

E. NAUMANN.
TIDE MOTOR.

No. 596,335. Patented Dec. 28, 1897.

WITNESSES:
J. P. Appleman.
W. H. Timmermann.

INVENTOR
Emil Naumann
BY
Henry C. Evert
ATTORNEY.

UNITED STATES PATENT OFFICE.

EMIL NAUMANN, OF HOMESTEAD, PENNSYLVANIA.

TIDE-MOTOR.

SPECIFICATION forming part of Letters Patent No. 596,335, dated December 28, 1897.

Application filed March 12, 1897. Serial No. 627,195. (No model.)

*To all whom it may concern:*

Be it known that I, EMIL NAUMANN, a citizen of the United States of America, residing at Homestead, in the county of Allegheny and State of Pennsylvania, have invented certain new and useful Improvements in Tide-Motors, of which the following is a specification, reference being had therein to the accompanying drawings.

This invention relates to certain new and useful improvements in motors, and relates more particularly to that class known as "tide-motors," whereby the rise and fall of the tide are utilized for mechanical purposes.

The object of the invention of the above-referred-to class is to provide a device whereby the rise and fall of the tide can be converted into power for manufacturing purposes.

With the above and other objects in view my invention finally consists in the novel construction, combination, and arrangement of parts to be hereinafter more specifically described, and particularly pointed out in the claim.

In describing the invention in detail reference is had to the accompanying drawings, wherein like figures of reference indicate similar parts throughout the several views, in which—

Figure 1:
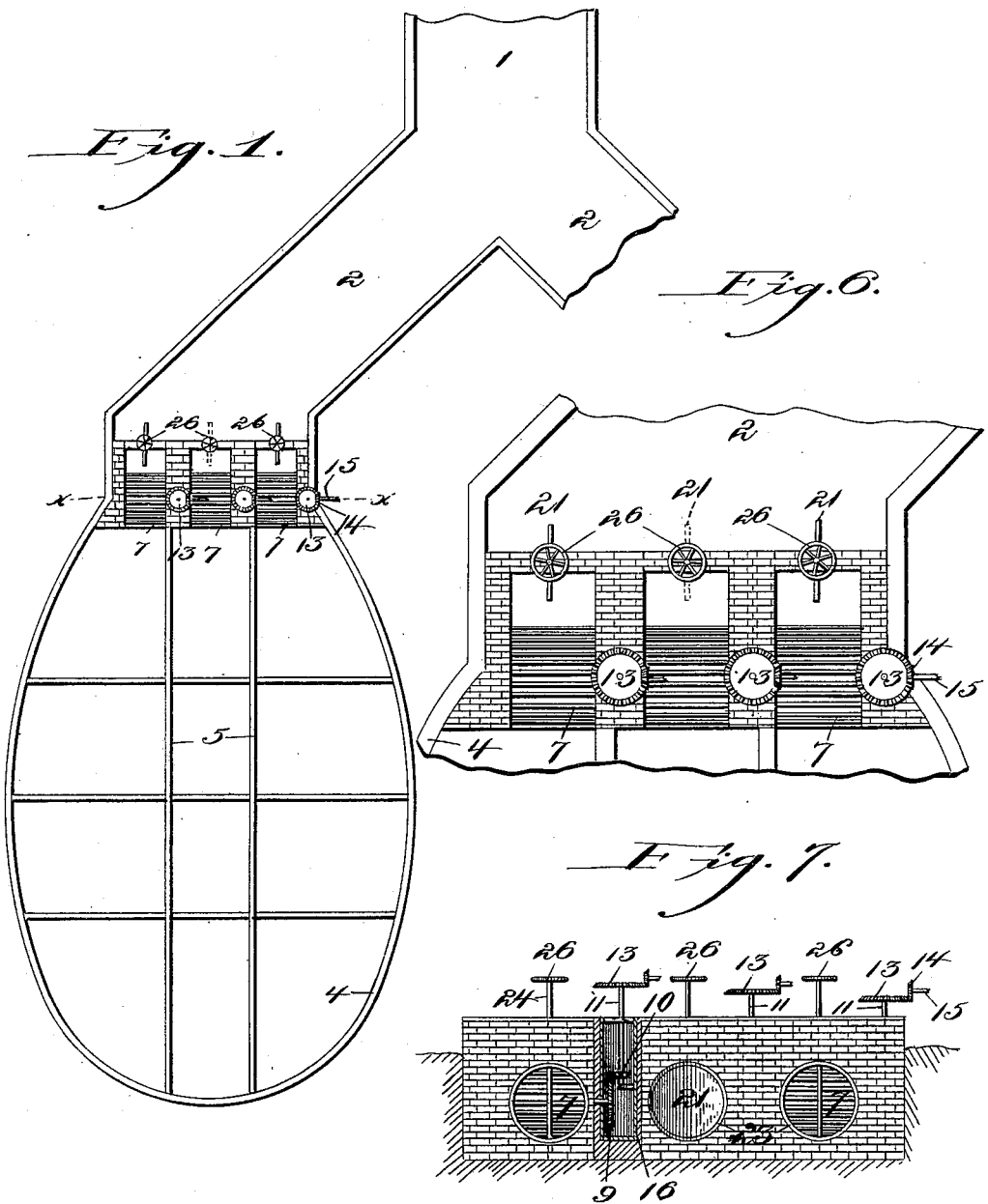
Figure 8:
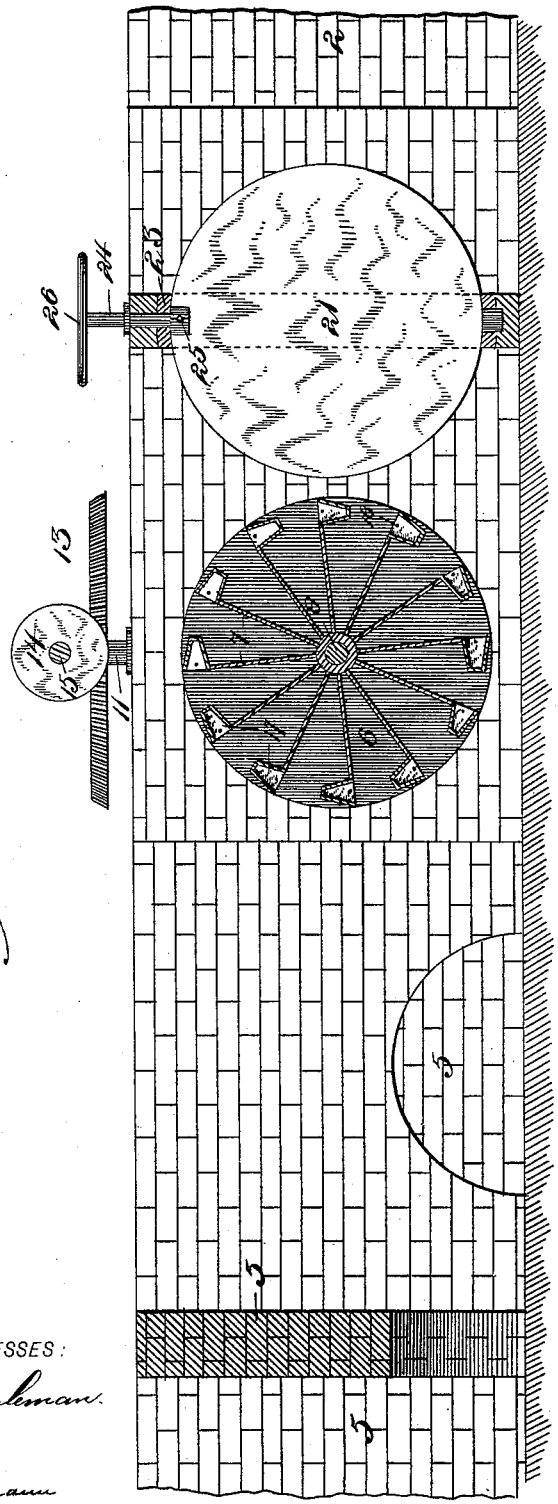

Figure 1 is a top plan view. Fig. 2 is a sectional view on line X X of Fig. 1. Fig. 3 is a sectional view of the water-wheel, showing the buckets. Fig. 4 is a view of the water-gates, showing it closed. Fig. 5 is a view of the same, showing it open. Fig. 6 is a top plan view of the water-wheel and gates. Fig. 7 is an end view of the gates enlarged. Fig. 8 is a vertical longitudinal sectional view through the basin, wheel, and gate.

Referring to the drawings, 1 designates the main waterway.

2 are branch waterways.

4 are reservoirs having partitions 5, arched at the bottom. (Not shown.) The basin 4 is constructed with sides and bottom, so as to hold water, and as the tide rises the water enters the basin through the channel 2, said channels also having sides and bottom. The partitions 5 serve to strengthen the basin. Each partition is arched at the bottom, forming a space, so as to permit the water to circulate freely.

6 are water-wheels having paddles or blades 7 and supported on axles 8, carrying a bevel gear-wheel 9, meshing with bevel gear-wheel 10, secured to one end of shaft 11, journaled in a support 12. Said shaft carries on its opposite end a bevel gear-wheel 13, meshing with a bevel gear-wheel 14, driving the power-shaft 15. The gear-wheels 9 and 10 are protected by means of a water-tight casing or box made of any suitable material.

In Fig. 3 the blades of the water-wheel carry revolving buckets 17, pivoted at 18 to the frame 19 of the blade.

20 designates a locking-pin passing through the frame 19 and engaging the bucket to prevent it from turning.

21 is a water-gate pivoted at 22 in frame 23. The shaft 24 is secured to the gate by means of bolts 25. The shaft 24 is provided with a suitable handle 26 for operating the gate.

The operation is as follows: As the tide flows the water enters the waterways, passes through the water-gates 21, and strikes the blades carrying the buckets 17 of the water-wheel, causing the same to rotate. The buckets are so arranged that the open portions of the buckets are turned to receive the force of the water, which gives a continuous motion to the bevel-gear 9, which in turn imparts motion to shaft 11 and gear-wheels 13 and 14 and power-shaft 15.

It will be noted that various changes may be made in the details of construction without departing from the general spirit of my invention.

Having fully described my invention, what I claim as new, and desire to secure by Letters Patent, is—

In a tide-motor, a waterway, gates located in said waterway, water-wheels provided with blades carrying reversible buckets having the mouth against the current, a locking-pin engaging the blade-frame and bucket, to prevent said buckets from turning, substantially as shown and described.

In testimony whereof I affix my signature in presence of two witnesses.

EMIL NAUMANN.

Witnesses:
 H. C. EVERT,
 GEO. B. PARKER.